United States Patent [19]
Greenbowe et al.

[11] Patent Number: 5,813,865
[45] Date of Patent: Sep. 29, 1998

[54] METHODS AND APPARATUS FOR TEACHING SCIENCE AND ENGINEERING

[75] Inventors: Thomas J. Greenbowe, Ames; Michelle A. McPhillen, Nevada, both of Iowa

[73] Assignee: Iowa State University Research Foundation, Ames, Iowa

[21] Appl. No.: 81,561

[22] Filed: Jun. 23, 1993

[51] Int. Cl.$^6$ .................................................. G09B 23/00
[52] U.S. Cl. ..................... 434/276; 434/118; 434/307 R; 434/362; 434/365; 364/578; 345/302; 345/473; 395/500; 395/927
[58] Field of Search .................................. 434/118, 276, 434/261, 307, 308, 309, 322, 323, 327, 350, 362, 365, 367, 379; 395/119, 122, 130, 135, 147, 152, 155, 157, 164, 375, 425, 575, 600, 927, 154; 364/400, 480, 514, 578, 710.03; 345/145; 283/43; 371/19, 29.1

[56] References Cited

U.S. PATENT DOCUMENTS

| | | | |
|---|---|---|---|
| 4,804,328 | 2/1989 | Barrabee | 434/323 X |
| 5,210,859 | 5/1993 | Aoshima et al. | 371/19 X |
| 5,237,648 | 8/1993 | Mills et al. | 395/152 X |
| 5,240,419 | 8/1993 | de Gyarfas | 434/118 X |
| 5,241,671 | 8/1993 | Reed et al. | 395/600 |
| 5,251,314 | 10/1993 | Williams | 364/419.1 X |
| 5,261,041 | 11/1993 | Susman | 395/152 |

OTHER PUBLICATIONS

"The Acid Test: Five years of Multimedia Chemistry" by Smith et al, Special Issue IBM Multimedia Supplement to T.H.E. Journal, Sep. 1991, pp. 21–23.
"IBM Brings Multimedia Impact to a Small, Small World", brochure of IBM PS/2 Multimedia for Microscopic Studies, 1991.

Primary Examiner—Joe Cheng
Attorney, Agent, or Firm—Robert E. Malm

[57] ABSTRACT

The apparatus for teaching science and engineering is an interactive multimedia computer system which is used to simulate the performance of scientific experiments on the computer screen. An experiment is a method for determining the value of one experimental parameter by measuring the value of another using an experimental configuration of devices and apparatus. The interactions of the devices and apparatus in the experimental configuration are governed by a relationship among the experimental parameters that define the configuration. The user of the teaching apparatus assembles a pictorial representation of the experimental configuration on the computer screen and interacts with the pictured experimental configuration to simulate the performance of an experiment. The pictured experimental configuration is governed by the same relationship among experimental parameters as the real configuration and thus, the results of the simulated experiment match the results of the experiment performed in the laboratory. Still images and short motion pictures relating to the subject matter of the experiment can be accessed by the user as an aid to his understanding of the subject matter.

40 Claims, 5 Drawing Sheets

METHODS AND APPARATUS FOR TEACHING SCIENCE AND ENGINEERING

BACKGROUND OF INVENTION

This invention relates generally to methods and apparatus for teaching the principles and concepts of science and engineering. More specifically, it relates to multimedia computer systems that expose students to scientific principles and concepts through a variety of multimedia interactions.

The teaching of science and engineering currently requires a student to be exposed to lectures, to read textbooks, to perform experiments in laboratories, to solve problems, and finally to be tested as to the knowledge he has acquired. This process tends to be disjointed and inefficient and may result in a typical student being unable to achieve a sense of integration in the subject matter.

Laboratory experiments tend to be very time consuming for the knowledge gained in performing them and may be dangerous if they are not closely monitored and controlled and limited in scope. The student in a laboratory environment is generally forbidden to respond to "what ifs" that pop into his mind—great stimulants to learning—because of concerns for his safety.

The teaching of problem solving is another area that is inadequately handled in the typical course of instruction. Generally speaking, science and engineering textbooks do not show problem solving as the truly messy task that it is. Nice and neat solutions consisting of three or four lines are presented. Students look at these and think, "There must be something wrong with me, because I have to erase and I make mistakes." In actuality, if an individual attempts to solve a task for which he or she does not immediately know the solution, the process is messy.

In the field of chemistry, for example, there has not been one general chemistry textbook published that has shown a true problem solving process. The reason for this deficiency seems to be that the textbook authors are experts in chemistry, and the problems for which they are providing solutions are no longer problems for them. For the experts, the problem-solving task is merely an exercise, and the expert's solution pathway reflects this mindset. For a student, the same task is a problem and it takes a student solution pathway to be effective in helping students understand how to represent the problem and how to apply problem solving strategies and techniques.

Textbooks, a key ingredient in the learning process, are inherently unsatisfactory for teaching certain types of subject matter. For example, general chemistry textbooks typically illustrate a chemical process by a series of diagrams. Unfortunately, most students have difficulty understanding what is being presented because the printed page cannot effectively convey motion and motion plays an important part in most chemical processes. The importance of visual representations is generally acknowledged but the theoretical basis for visual representations of science concepts is not a well developed area.

BRIEF SUMMARY OF INVENTION

The apparatus for teaching science and engineering is a multimedia computer system with which a user interacts to perform simulations of experiments in science and engineering that he would normally perform in a laboratory. The starting point for a laboratory experiment is an experimental configuration of equipment, apparatus, devices, materials, and supplies. The operation of the experimental configuration can be characterized by the relationships that exist among a plurality of experimental parameters. The nature of the relationships may be expressed by an equation or tables of values. The objective of a typical experiment is to measure one of the experimental parameters and then to determine the value of another experimental parameter using the characterizing equation or tables of values, the measured value, and the known values of the remaining experimental parameters.

The present invention provides the means for a user to assemble on the computer screen a simulated experimental configuration using images of the configuration building blocks that are initially displayed on the screen. The operation of the simulated experimental configuration is governed by the same relationship among the experimental parameters that characterizes the experimental configuration that served as a model for the simulated version. The user, using the simulated experimental configuration to perform an experiment, thus obtains the same experimental results on the computer screen as he would have if he had performed the experiment in the laboratory.

The computer system also provides the means for displaying the phenomena that underlie the operation of the experimental configuration as, for example, the movement of ions and electrons in electrochemical cells.

An additional aid to the learning process of a user is the provision of a means for displaying on the computer screen short motion pictures pertaining to the subject matter of the experiment being performed.

DESCRIPTION OF THE PREFERRED EMBODIMENT

The apparatus described herein is intended to be a vehicle for illustrating and teaching science and engineering principles and concepts typically discussed in college textbooks. It enables a student to perform scientific experiments similar to the ones presently being performed by students in university laboratories, to view motion videos that illustrate the scientific principles involved, and to develop an understanding of the subject matter by observing and listening to lecturers, and to test his knowledge by taking quizzes.

The preferred embodiment of the invention focuses on the teaching of chemistry subject matter. However, the invention is generally useful for the teaching of any area of science or technology where the student's learning experience would be benefited by his performing scientific experiments in laboratory surroundings.

The preferred embodiment is an interactive audiovisual computer system capable of presenting to a user audiovisual information responsive to the user's educational needs and desires. The computer system is comprised of conventional components that are well-known in the art. The novelty of the apparatus lies in the manner by which the components and the user interact to accomplish a teaching function.

Figure 1:
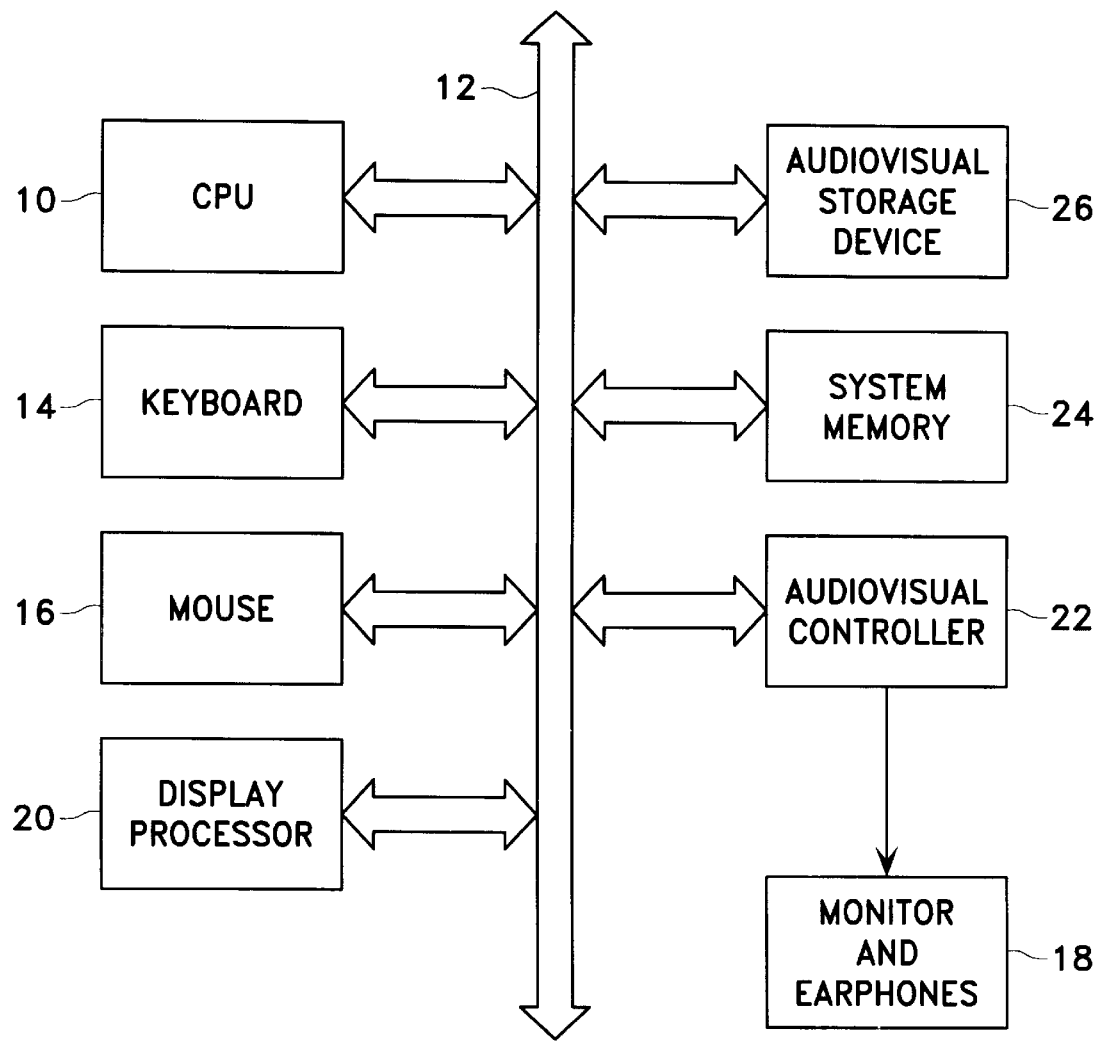
FIG. 1 shows a block diagram of an interactive multimedia computer system for teaching science and engineering.

A functional block diagram of the computer system is shown in FIG. 1. The central processing unit (CPU) 10 provides the general computational power for the system and exercises control over the other system components by means of the system bus 12. The CPU 10 accepts user inputs from either the keyboard 14 or the mouse 16 and delivers audiographic (i.e. graphics, sounds, and voice) outputs to the monitor/earphones 18 via the audiodisplay processor 20 and the audiovisual controller 22. The system memory 24 is the memory resource for all of the graphics activities of the CPU 10. Motion picture segments are stored in the audiovisual storage device 26 and displayed on the monitor 18 upon command of the CPU 10 via the audiodisplay processor 20 and the audiovisual controller 22.

The apparatus operates interactively with a student by means of the keyboard 14 and the mouse 16 in a manner that has become commonplace with the availability of the Apple Macintosh family of personal computers and the IBM family of personal computers that utilize Microsoft's Windows environment. The basics of user-computer interactive techniques, including the terminology used herein, are extensively discussed in Chapters 8, 9, and 10 of James D. Foley et al., *COMPUTER GRAPHICS, PRINCIPLES AND PRACTICE*, 2nd Ed., Addison-Wesley Publishing Co., Reading, Mass., 1990.

A commercial version of the preferred embodiment hardware is available by combining one of the Macintosh II family of computers manufactured by Apple Computer Co. with an Apple CD-ROM player.

The software that governs the operations of the CPU 10 consists of three components: (1) the application model, (2) the application program, and (3) the graphics system. The scope of the application model and application program is equivalent roughly to a chapter of a textbook.

Figure 2:
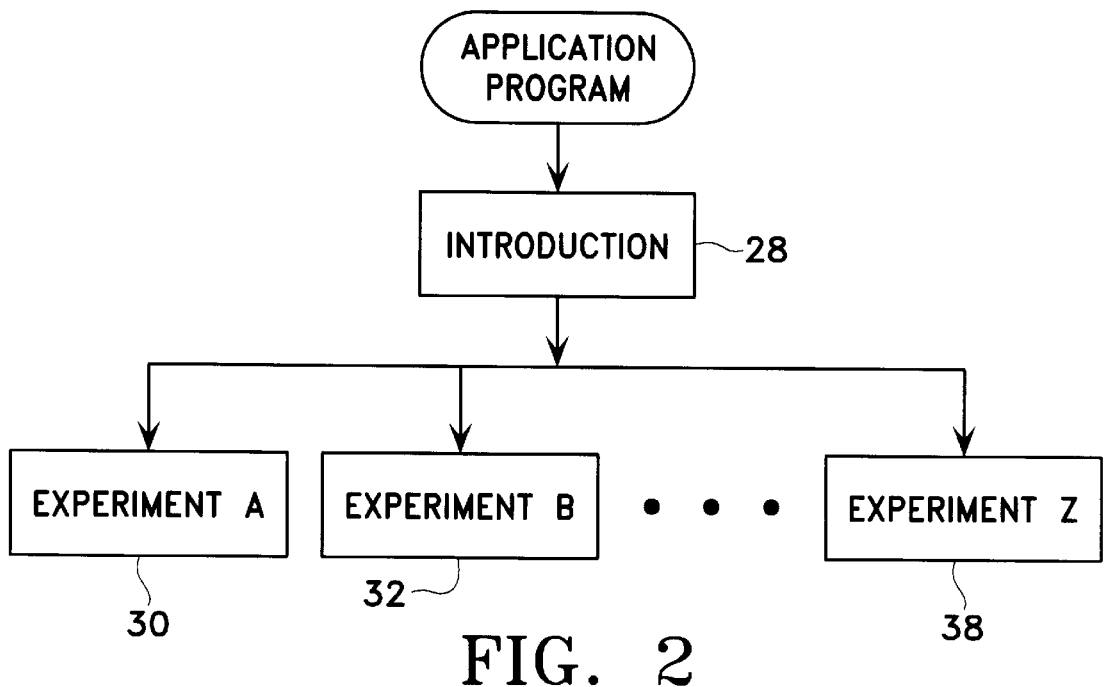
FIG. 2 shows the major segments of the application program for teaching science and engineering.

The application program consists of the program parts shown in FIG. 2. The program begins with and INTRODUCTION part 28 which describes the content of the program and gives the requisite knowledge and skills required of the student. The EXPERIMENT parts 30, 32, . . . , 38 are devoted to particular experiments that may be performed by the student. The experiments may be performed in any order though a specific order is recommended the first time through.

Figure 3:
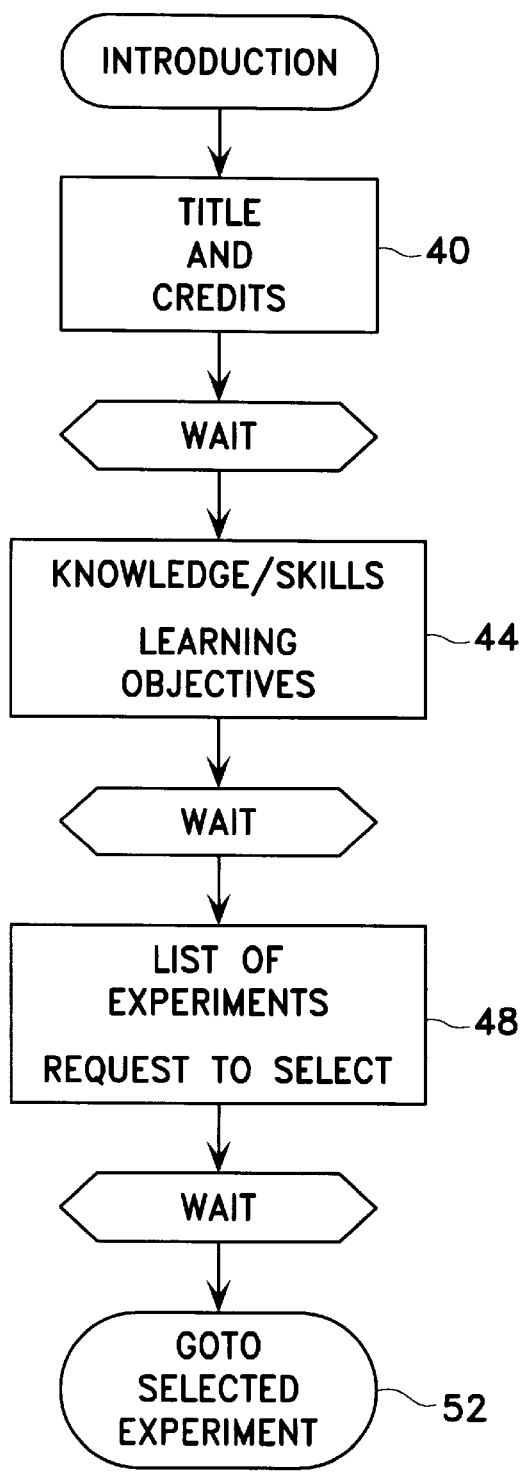
FIG. 3 details the INTRODUCTION part of the application program for teaching science and engineering.

The segments comprising the INTRODUCTION 28 are identified in FIG. 3. Segment 40 causes the title and credits for the application program to be displayed. The CPU 10 (FIG. 1) waits until the student indicates his desire to proceed by pushing the keyboard "enter" key whereupon segment 44 causes the requisite knowledge and skills to perform the experiments together with learning objectives to be displayed. For example, the prerequisite knowledge and skills for an experiment having to do with electrochemical cells are:

1. Balancing oxidation-reduction reactions using the method of half-reactions;
2. aqueous equilibria systems;
3. mass action expression;
4. logarithms;
5. calculating the emf of standard electrochemical cells using standard electrode potentials.

The learning objectives for electrochemical cell experiments are stated as:

1. How to diagram simple electrochemical cells including the labeling of the anode, the cathode, the directions of flow of ions in solutions, the directions of flow of electrons in wires, and the signs of the electrodes;
2. How to use the Nernst equation to calculate Emf of various electrochemical cells under nonstandard conditions;
3. How to use a graph of EMF versus the logarithm of the ratio of the solution concentrations to predict the EMF of concentration cells having solutions of arbitrary concentration.

The CPU 10 (FIG. 1) again waits until the student pushes the "enter" key at which time segment 48 causes a list of available experiments to be displayed. A request is simultaneously displayed on the screen for the student to select a particular experiment to perform. The student selects a particular experiment by entering the appropriate number by keyboard or does a mouse selection from the experiment menu. The CPU 10 (FIG. 1) waits until the student makes a selection and then transfer 52 is made to the selected experiment segment.

Figure 4:
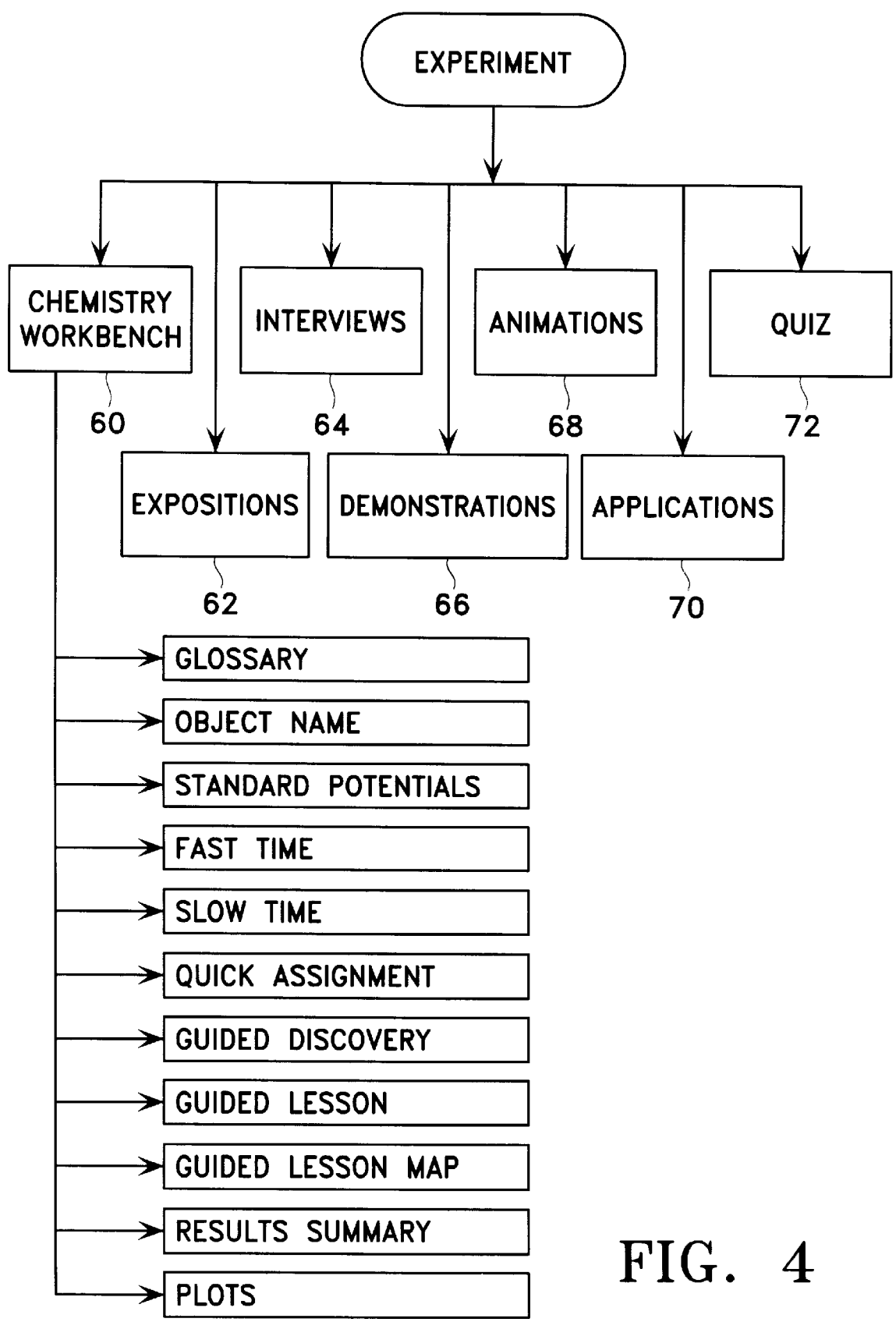
FIG. 4 details the EXPERIMENT part of the application program for teaching science and engineering.

The typical experiment is detailed in FIG. 4. The CHEMISTRY WORKBENCH segment 60 provides a microworld environment for the student that simulates a chemistry laboratory in which a student can perform experiments. The chemistry workbench gives a student the opportunity to design and build an experiment by manipulating experimental apparatus, chemicals, and instruments and controlling experimental conditions such as temperature, pressure, and other parameters. The student does this in complete safety and in less time than it would take if the investigations were to be conducted in a chemistry laboratory.

The application model is a specification in mathematical terms of the chemistry workbench and the apparatus, devices, chemicals, reagents, solutions, etc. that a student may use in building an experimental configuration. The application model encompasses shapes of objects, appearance attributes of objects, sounds of objects, and relationships among objects. Examples of object sounds are the thump of a beaker when it contacts the workbench and the gurgling sounds of a liquid flowing out of a reagent bottle when the bottle is tilted.

The application program handles user inputs, modifies the application model in accordance with instructions contained in the user inputs, and then translates the ensemble of objects specified in the application model into a detailed geometric description of what is to be viewed on the monitor 18 (FIG. 1), the attributes that describe how the objects should appear, and the sounds that are to accompany the display of the objects. The graphics system utilizes the information developed by the application program to produce the actual picture to be displayed and the sounds to be heard and passes user inputs via either the keyboard 14 or the mouse 16 (FIG. 1) to the application program. The video controller 22 (FIG. 1) performs the function of constantly refreshing the display shown on the monitor 18 (FIG. 1).

As the students build and test experiments, they have the option of viewing a microscopic animation of how atoms, ions, or molecules are behaving for the exact system that they have constructed. They also have the option of viewing color images or a color motion video of the experiment they designed and constructed as it is operating. Sound is also incorporated when appropriate.

Students are asked to predict the results of their experiment (e.g. voltage, pressure, temperature, mass, etc.) and to predict what is happening on the atomic and molecular level. The student predictions are compared with the actual experimental results and with the scientifically accepted view of atomic and molecular behavior. Students have the option of working standard problems, answering questions, or working with conceptual (i.e. qualitative) problems.

The EXPOSITIONS segment 62 (FIG. 4) causes short motion pictures to be retrieved from the audiovisual storage device 26 (FIG. 1) and displayed on the monitor 18 (FIG. 1). The motion pictures feature three types of individuals—an undergraduate student, a graduate student, and a professor—explaining their views of common misconceptions having to do with an area of chemistry and how they go about solving chemistry problems. Since the "explainers" present the information in their own ways, a student using the system may eventually choose to see only those explainers to whom they can best relate.

Through the use of multimedia, examples of true problem solving being done by students are captured. Problem solving strategies and techniques are modeled effectively for students because they are being utilized by students. Common misconceptions can be more easily addressed in this way than by the printed page.

The INTERVIEWS segment 64 (FIG. 4) consists of short motion pictures of interviews with scientists. Scientists discuss how they became interested in chemistry and what combination of events led to their discoveries. Historical films featuring prominent scientists are included when available.

The DEMONSTRATIONS segment 66 consists of audiovisual sequences in color of chemical reactions that are typically shown in textbooks using color photographs. Users have the options of stopping the sequence, running it in reverse, or running it in slow motion.

The ANIMATIONS segment 68 (FIG. 4) consists of short animated sequences accompanied by a voice commentary of chemical processes typically found in general chemistry textbooks. General chemistry textbooks typically show these processes by using a series of diagrams. However, most students have difficulty understanding what is being presented because the printed page cannot effectively communicate the dynamics of a process. The animations are designed to allow instructors to clearly show students the dynamic aspects of chemistry. Recent research in computer animations suggests that animation sequences with narrations help students because students are often not aware of what to look for and what emphasis to place on the visual information.

The color movies are stored in the audiovisual storage device 26 (FIG. 1) which can be a large hard-disc drive having a capacity of 650 MegaBytes or a compact disc. Color movies and color images can be created with a video camera using Digital Video Software by SuperMac and a VideoSpigot NuBus board by SuperMac in a Macintosh computer.

The APPLICATIONS segment 70 causes to be displayed a combination of computer-animated sequences and movies depicting how chemical principles are used in everyday life, in industry, and in medicine and require two to three minutes to view. The segment includes two to three animation sequences lasting 20–25 seconds a piece.

The QUIZ segment 72 (FIG. 4) tests the student's knowledge and understanding of the experiment that he has performed. The quiz typically takes 8–12 minutes to complete and involves two or three problems, each with multiple parts. The quiz includes both quantitative and qualitative (conceptual) problems. A quiz "engine" is provided that pseudorandomly selects problems from a bank of twenty "stock" problems and generates slight variations of the information presented in the problems. Thus, students retaking the quiz are likely to be assigned different problems, and students taking the quiz later in the week are likely to be assigned problems different from those assigned to students earlier in the week. A student's answers to the problems together with the correct answers are displayed for the student. A student's answers are also stored in the computer for later perusal by the instructor.

A quiz relating to electrochemical cells, for example, might consist of the following questions:
1. Use the Nernst equation and standard reduction potentials to calculate the EMF for each of the following electrochemical cells.
   a. $Mg|Mg^{2+}(aq, 0.0015M)||Mg^{2+}(aq, 2.0M)|Mg$
   b. $Mg|Mg^{2+}(aq, 2.0M)||Zn^{2+}(aq, 0.0015M)|Zn$
   c. $Mg|Mg^{2+}(aq, 0.025M)||Mg^{2+}(aq, 1.5M)|Mg$
   d. $Ni|Ni^{2+}(aq, 0.045M)||Ag^{+}(aq, 0.50M)|Ag$
2. For each of the above electrochemical cells identify the anode, cathode, direction of ion migration, direction of movement of electrons. Write the balanced equation for the cell.

Figure 6:
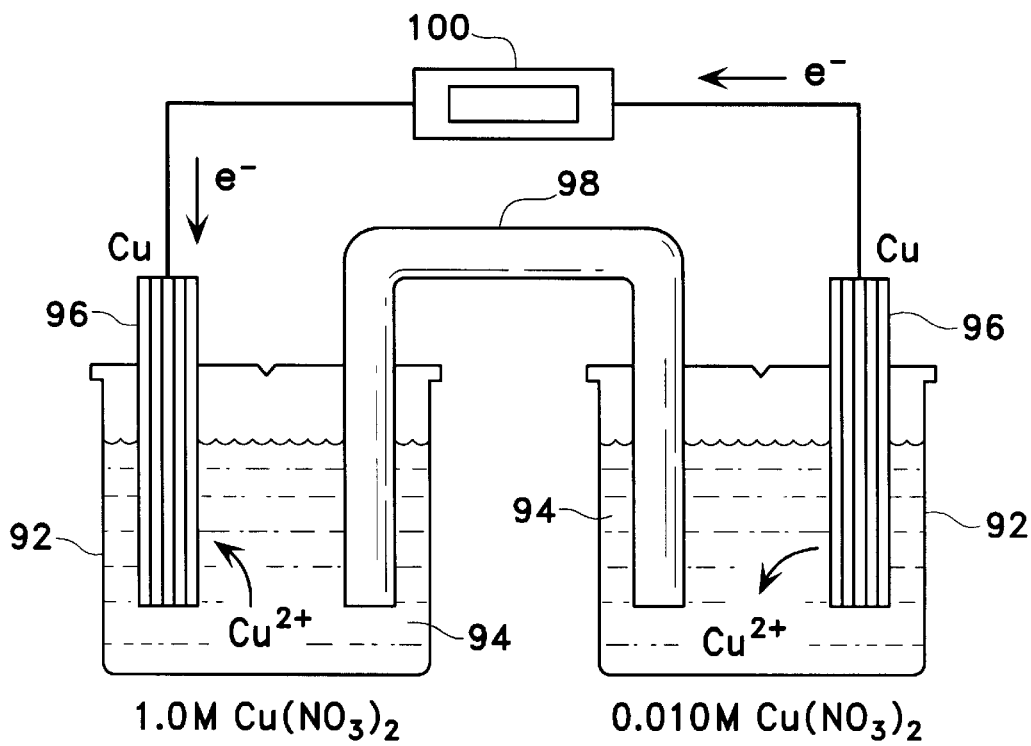
FIG. 6 shows a cross-sectional view of an experimental configuration involving an electrochemical cell.
Figure 5:
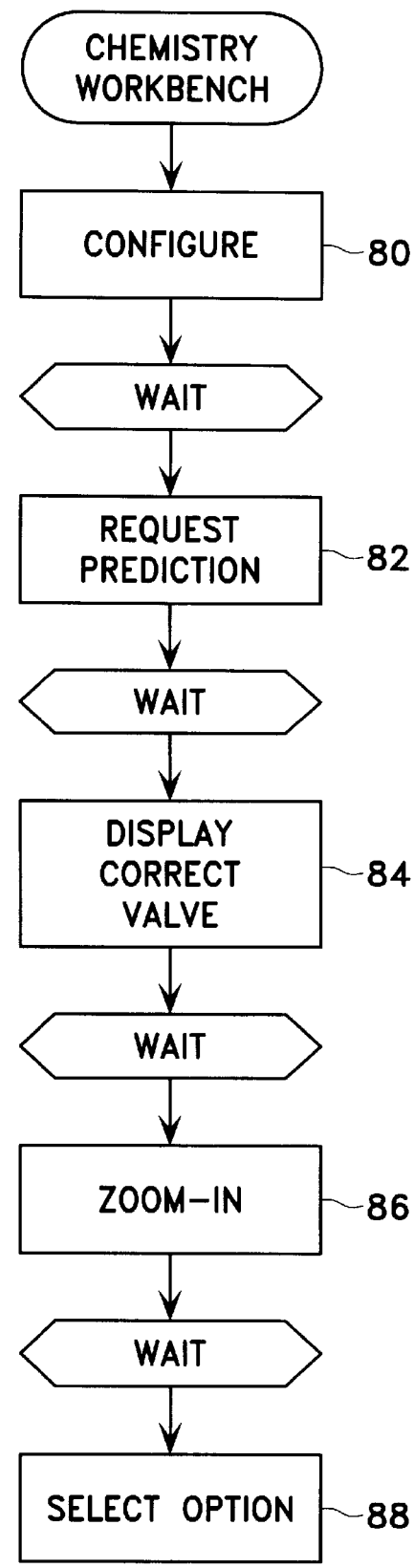
FIG. 5 details the CHEMISTRY WORKBENCH segment of the EXPERIMENT part of the application program for teaching science and engineering.

The CHEMISTRY WORKBENCH segment 60 (FIG. 4) of an experiment is detailed in FIG. 5. The experiment that will be used in describing segment 60 has to do with electrochemical cells—specifically, concentration cells—an example of which is shown in FIG. 6. A concentration cell is comprised of beakers 92 containing cupric nitrate solutions 94, copper electrodes 96, and a salt-bridge 98. The voltmeter 100 provides the means for measuring the voltage developed by the cell. The key idea of a concentration cell is that a potential between electrodes occurs when the concentration of the solutions in the half-cells are different. Through electron transfer and ion migration, one half-cell increases in concentration and the other half-cell decreases in concentration.

It is important for students to understand that in a concentration electrochemical cell, the dilute solution will increase in concentration and the concentrated solution will decrease in concentration. Over time the concentrations of the two cells will equalize which is indicated on the screen by the blue concentrated solution becoming lighter in shade and the dilute solution becoming darker until the two shades are the same.

In this experiment, students calculate the voltages of the electrochemical concentration cells they construct.

The electrochemical cell pictured in FIG. 6 can be represented by the following short-hand expression. The words beneath the short-hand expression explain the meanings of the symbology used in the expression.

$$Cu|Cu^{2+} (aq, 0.010\ M)||Cu^{2+} (aq, 1.0\ M)|Cu$$

| oxidation process | reduction process |
|---|---|
| Cu electrode, anode | Cu electrode, cathode |
| 0.010 M $Cu^{2+}$ solution | 1.0 M $Cu^{2+}$ solution |
| salt-bridge | |

(A salt-bridge is a device, such as a tube containing a saturated solution of potassium chloride in a gel of agar-agar, which allows ions to migrate through it freely so as to compensate for the increase in the number of copper ions in one half-cell and the decrease in the number of hydronium ions in the other half-cell.)

This experiment provides students the choice of building electrochemical cells using copper electrodes, nickel electrodes, and any two of the aqueous solutions 1.0M $Cu^{2+}$, 0.10M $Cu^{2+}$, 0.01M $Cu^{2+}$, 1.0M $Ni^{2+}$, 0.10M $Ni^{2+}$, and 0.01M $Ni^{2+}$.

The CONFIGURE segment 80 (FIG. 5) begins with the display of the experimental apparatus and supplies available to the student. A black bench top is shown at the bottom of the screen and two brown shelves are shown in the upper portion—one in the middle of the screen and the other halfway between the middle and the top. On the shelves are reagent jars filled with chemical solutions, wires, a salt-bridge, a voltmeter, beakers, and a blue cabinet that opens to reveal two copper metal electrodes and two nickel metal electrodes. A solution in the reagent jar or in a beaker has a shade of blue representative of its concentration. Concentrated solutions have dark shades of blue and dilute solutions have light shades.

A student constructs an electrochemical cell by using the mouse 16 (FIG. 1) and "point-and-click" techniques to select the various apparatus from the shelves and drag them to their proper locations on the workbench top.

The student is able to construct the cells as he sees fit given the available reagent solutions and electrodes. The student needs to make several choices during the construction of the cell: which solutions to use, which metal to place in which solution, how to connect the voltmeter. The beakers need to be placed next to each other and filled with chemical solutions from the reagent jars. The salt-bridge must be positioned to connect the two beakers. Metal electrodes must be placed in the solutions. The electrodes must be connected by wire to the voltmeter.

Students are allowed to construct the cells as they would if they were doing the experiment in the laboratory. If a student decides to put a beaker with the 1.0M $Cu^{2+}$ solution on the right and the 0.01M $Cu^{2+}$ solution on the left, the student will for each item point-and-click on it and drag it to the desired position on the workbench. There it will remain after the mouse button is released. The program permits the apparatus to be placed only in realistic positions and orientations, i.e. in stable positions on the workbench top, on the shelves, or attached to or supported by other apparatus.

There are 21 possible "normal" combinations of cells that can be explored. "Normal" combinations are:

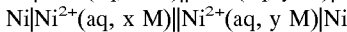
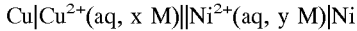

where x and y can have any of the values 1.0, 0.1, and 0.01. Students are not expected to explore all 21 possible combinations.

Other possible combinations can be constructed by placing a copper electrode in a nickel nitrate solution or a nickel electrode in a copper(II) nitrate solution. These are non-productive cells in that a voltage is unsustainable because of the short circuit caused by the copper electrode reacting directly with the nickel nitrate solution or the nickel metal electrode reacting directly with the copper(II) nitrate solution. The electrons are exchanged directly between the metal and the solution and cannot be "harnessed" to do work.

Students electing to construct non-productive cells are limited to the following ones:

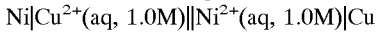
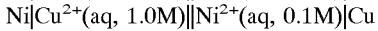
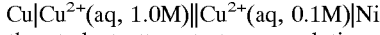

If the student attempts to use solutions of concentrations other than those indicated, he is instructed by an on-screen message of the choices he has available.

After completing the setup, the student may select from the option menu the option of viewing an image or movie of the actual apparatus configured in the same way as the benchtop configuration.

When the student has completed the experimental configuration, he signals the computer by pushing the "enter" key of the keyboard 14 (FIG. 1) and segment 82 is performed. A highlighted "e" appears next to the wire connecting the electrodes, a highlighted "$Cu^{2+}$" appears in each solution between the electrode and the salt-bridge, and highlighted "$K^+$" and "$NO_3^-$" appear in the salt-bridge. The student is requested to indicate the directions of flow of the highlighted quantities. The student is expected by means of the mouse 16 (FIG. 1) to drag each of the symbols a short distance in the direction of its flow. The student's actions are recorded on the screen by placing arrows pointing in the appropriate direction next to each of the highlighted symbols.

Next, the highlighted word "concentration" appears in each solution. The student is expected to drag each word either upward, signifying an increasing concentration over time, or downward, signifying a decreasing concentration. The student's actions are again recorded on the screen with appropriate arrows next to the highlighted words.

If the student errs, the symbols next to the incorrectly pointing arrows are caused to flash on and off and an "incorrect" message appears next to the flashing symbol. The student is required to correct his errors before the program moves on.

The highlighted word group "anode or cathode" appears next on the screen next to each of the two electrodes. The student is instructed to identify each electrode by selecting the proper term. The terms selected by the student remain highlighted while the alternative terms are shown in normal contrast. If the student errs in his selections, his incorrect selections are caused to flash on and off and an "incorrect" message appears next to each flashing symbol. Again the student must correct his errors before moving on.

Finally, a message on the screen requests the student to enter his value for the cell EMF. The student is expected to use the Nernst equation $$E_{cell} = E°_{cell} - 0.0591(\log Q)/n \qquad (1)$$

where $E_{cell}$ is the cell EMF, $E°_{cell}$ is the cell EMF under standard conditions (1.0M, 1.0 atm, 25° C.), Q is the ratio of the concentrations of the dilute and the concentrated solutions (a number less than one), and n is the number of electrons removed from the metal electrode atom in creating the ion. The quantity $E°_{cell}$ can be calculated from the standard oxidation-reduction potentials E°.

$$E°_{cell} = E°(\text{substance reduced}) - E°(\text{substance oxidized}) \qquad (2)$$

The transfer to segment 84 occurs when the student enters his value for the EMF. Segment 84 then causes the voltmeter 100 (FIG. 6), which was disabled until now, to show the correct value of the EMF. The correct value of the EMF is determined by the CPU 10 (FIG. 1) by substituting in the Nernst equation the values for the experimental parameters that correspond to the student's experimental configuration.

When the student signals his desire to continue by pushing the "enter" key of the keyboard 14 (FIG. 1), the ZOOM-IN segment 86 (FIG. 5) is performed. The electrochemical cell is enlarged to occupy the entire screen and the migration of ions in the salt-bridge, the migration of ions in the solutions, and the direction of electron flow in the wires and in the electrodes are animated.

The student ends the zoom-in session by pushing the "enter" key and the SELECT OPTION segment 88 (FIG. 5) requests that the student select an option from the option menu.

The first-level options that the student has available are the quit command which terminates the program and the following program parts and segments: EXPERIMENT, CHEMISTRY WORKBENCH, EXPOSITIONS, INTERVIEWS, DEMONSTRATIONS, ANIMATIONS, APPLICATIONS, AND QUIZ. The first-level options are listed on a menu bar at the top of the screen and are selected by means of a mouse point-and-click operation. Selecting and pulling down a first-level option reveals the second-level options available under the selected first-level option.

The EXPERIMENT entry in the menu bar includes the current experiment number. Selecting and pulling out the second-level options associated with EXPERIMENT identifies the available experiments by number, title, and a concise description.

The first-level program segment options listed above beginning with CHEMISTRY WORKBENCH pertain to the current experiment. The selection of any of the first-level program segment options causes the CPU 10 (FIG. 1) to return to the beginning of the selected program segment unless the program segment is already in progress.

The second-level options that are revealed when the CHEMISTRY WORKBENCH option is pulled down are: glossary, object name, standard potentials, fast time, slow time, quick assignment, guided discovery, guided lesson, guided lesson map, results summary, and plots.

The selection of the "glossary" option causes a glossary of terms relating to concentration cells to be displayed on the screen.

The selection of the "object name" option causes object names to be placed in text boxes adjacent to the objects on the screen.

The selection of the "standard potentials" option causes a table of standard oxidation-reduction potentials to be displayed on the screen as an aid to the student when he calculates the expected Emf of his concentration cells.

The selection of the "fast time" option causes the concentration cell to fully occupy the screen with a very-fast-running clock in the upper corner that indicates the speed-up in the passage of time. By selecting this option, a student is able to see, for example, the 1.0M copper(II) nitrate solution take on lighter shades of blue as it becomes more dilute over time while the 0.01M copper(II) nitrate solution takes on darker shades of blue as it becomes more concentrated. The student is also able to see the reading of the voltmeter decrease over time. When the voltmeter reaches zero, the colors of the solutions are shown to be identical. During "fast time" the student is able to see electrons moving and ions migrating—some onto an electrode thus increasing the mass of the electrode, some off of an electrode thus decreasing the mass of that electrode.

The "slow time" option is available for those situations where the chemical reactions occur so rapidly that a slow-down on the screen is necessary for the student to understand what is happening.

The selection of the "quick assignment" option causes segments 82 and 86 shown in FIG. 5 to be omitted when the "chemistry workbench" segment is performed. In addition, if a concentration cell already exists on the workbench, substitutions of electrodes and solutions can be made simply by performing a first "point-and-click" on the object on the workbench for which a substitution is to be made and a second "point-and-click" on the object on the shelves to be substituted. In the "quick assignment" mode a student can quickly determine the voltages associated with a variety of concentration cells.

The selection of the "guided discovery" option provides the student with textual messages as he builds his experimental configurations and performs his experiments that help him to decide what to explore and how to interpret the results of his experiments.

The selection of the "guided lesson" option provides the student with specific instructions on how to construct electrochemical concentration cells and specific suggestions on what to look for in performing experiments with the cells.

The selection of the "guided lesson map" option provides the student with a visual reference of which activities have and have not been attempted during the guided lesson.

The selection of the "results" option provides a summary of the experiments performed and the results obtained by the student.

The selection of the "plots" option provides plots of the student's experimental data. The student is requested to select from the "results" screen the data to be plotted and the experimental parameters or the functions thereof that are to be designated as abscissa and ordinate respectively. The appropriate plot then appears on the screen.

Repeating the selection of any of the second-level options deselects the option.

The second-level options available with the first-level options EXPOSITIONS, INTERVIEWS, DEMONSTRATIONS, ANIMATIONS, and APPLICATIONS are a listing of the available EXPOSITIONS, INTERVIEWS, DEMONSTRATIONS, ANIMATIONS, and APPLICATIONS with a concise description of each.

Another example of an experiment that can be performed by a student using the present invention is one having as its objective the determination of the concentration of a solution using concentration cells.

The previously-described experiment emphasized calculating electrochemical cell EMFs given two solutions of known concentration. Often, chemists are faced with the need to measure the concentration of a solution. This can be accomplished by electrochemistry and the use of the Nernst equation (1) above. One important application of the Nernst equation is the relationship between concentrations of an aqueous solutions and the measured EMF. For example, suppose we have an electrochemical cell consisting of a copper electrode, 1.0M $Cu^{2+}$ solution, a zinc electrode, and a solution of $Zn^{2+}$ of unknown concentration. By measuring the EMF of the cell and substituting this value together with the known concentration of the copper(II) solution in the Nernst equation, we can solve for the unknown concentration.

The selection of this experiment by a student would result in the opening screen of the CHEMISTRY WORKBENCH segment 60 (FIG. 4) showing wires, a salt-bridge, a voltmeter, beakers, copper electrodes, nickel electrodes, zinc electrodes and the following aqueous solutions: 1.0M $Cu^{2+}$, 1.0M $Zn^{2+}$, 1.0 $Ni^{2+}$, ? M $Ni^{2+}$, ? M $Zn^{2+}$, ? M $Cu^{2+}$. The task in this experiment is to construct electrochemical cells to determine the concentration of each of the three solutions of unknown concentration. Several different electrochemical cells must be constructed by the student to solve this problem. The EMF of a cell is obtained by a pseudorandom selection from a table of 40 values which provides the student with a variety of solution concentrations to determine.

A student may choose to investigate the copper(II) solution of unknown concentration using a Cu/Cu system.

Depending on how the student hooks up the leads to the voltmeter, either a positive or negative voltage will be obtained. If a negative voltage is obtained, the student will be directed to readjust the wire leads to the voltmeter so that a positive voltage is obtained. This action will make identification of the anode and cathode an easier chore. If the student is using a 1.0M $Cu^{2+}$|Cu half-cell and connecting the copper electrode to the reference side of the voltmeter, then a positive voltage reading indicates that the solution has a concentration less than 1.0M. For example, the following voltage readings leads to the concentration in the unknown solutions as follows:

EMF=0.000 V Cu|$Cu^{2+}$(aq, 1.0M)||$Cu^{2+}$(aq, 1.0M)|Cu

EMF=0.029 V Cu|$Cu^{2+}$(aq, 0.10M)||$Cu^{2+}$(aq, 1.0M)|Cu

EMF=0.059 V Cu|$Cu^{2+}$(aq, 0.010M)||$Cu^{2+}$(aq, 1.0M)|Cu

EMF=0.118 V Cu|$Cu^{2+}$(aq, 0.00010M)||$Cu^{2+}$(aq, 1.0M)|Cu

Under these circumstances, the transfer from program segment 80 (FIG. 5) to segment 82 results in a pseudorandomly selected voltage between 0 and 0.118 V being shown on the voltmeter display. Segment 82 then invites the student to specify the flow directions of electrons and ions, the directions of change in concentration of the solutions, and the identities of the anode and cathode, as previously described. Segment 82 then requests the student to enter his value for the concentration of the solution that he is investigating.

The transfer to segment 84 that occurs with the entry of the student's value for the concentration causes the correct value to be displayed on the screen.

If the solution has a concentration greater than 1.0M, and the student keeps the reference side of the voltmeter attached to the copper electrode in the 1.0M solution, then a negative voltage is obtained as, for example, in the case of the following cells.

EMF=−0.0089 V Cu|$Cu^{2+}$(aq, 1.0M)||$Cu^{2+}$(aq, 2.0M)|Cu

EMF=−0.0180 V Cu|$Cu^{2+}$(aq, 1.0M)||$Cu^{2+}$(aq, 4.0M)|Cu

The program produces negative voltage readings down to −0.018 V if the cell is a copper-based configuration thereby enabling students to explore solution concentrations as high as 4.0M.

Students can construct cells using a 1.0M $Zn^{2+}$|Zn half-cell as the reference to measure the unknown concentration of the zinc solution. For example, EMF=0.0296 V Zn|$Zn^{2+}$(aq, 0.10M)||$Zn^{2+}$(aq, 1.0M)|Zn EMF=0.0592 V Zn|$Zn^{2+}$(aq, 0.010M)||$Zn^{2+}$(aq, 1.0M)|Zn EMF=0.0888 V Zn|$Zn^{2+}$(aq, 0.0010M)||$Zn^{2+}$(aq, 1.0M)|Zn Students can construct cells using a 1.0M $Ni^{2+}$|Ni half-cell as the reference to measure the unknown concentration of the nickel solution. For example, EMF=0.030 V Ni|$Ni^{2+}$(aq, 0.10M)||$Ni^{2+}$(aq, 1.0M)|Ni EMF=0.059 V Ni|$Ni^{2+}$(aq, 0.010M)||$Ni^{2+}$(aq, 1.0M)|Ni EMF=0.088 V Ni|$Ni^{2+}$(aq, 0.0010M)||$Ni^{2+}$(aq, 1.0M)|Ni Students can construct cells using a 1.0M $Ni^{2+}$|Ni half-cell as the reference to measure the unknown concentration of the copper solution. For example, EMF=0.560 V Ni|$Ni^{2+}$(aq, 1.0M)||$Cu^{2+}$(aq, 0.10M)|Cu EMF=0.531 V Ni|$Ni^{2+}$(aq, 1.0M)||$Cu^{2+}$(aq, 0.010M)|Cu EMF=0.501 V Ni|$Ni^{2+}$(aq, 1.0M)||$Cu^{2+}$(aq, 0.0010M)|Cu Students can construct cells using a 1.0M $Cu^{2+}$|Cu half-cell as the reference to measure the unknown concentration of the nickel solution. For example, EMF=0.620 V Ni|$Ni^{2+}$(aq, 0.10M)||$Cu^{2+}$(aq, 1.0M)|Cu EMF=0.650 V Ni|$Ni^{2+}$(aq, 0.010M)||$Cu^{2+}$(aq, 1.0M)|Cu EMF=0.680 V Ni|$Ni^{2+}$(aq, 0.0010M)||$Cu^{2+}$(aq, 1.0M)|Cu Students can construct cells using a 1.0M $Zn^{2+}$|Zn half-cell as the reference to measure the unknown concentration of the copper solution. For example, EMF=1.070 V Zn|$Zn^{2+}$(aq, 1.0M)||$Cu^{2+}$(aq, 0.10M)|Cu EMF=1.041 V Zn|$Zn^{2+}$(aq, 1.0M)||$Cu^{2+}$(aq, 0.010M)|Cu EMF=1.011 V Zn|$Zn^{2+}$(aq, 1.0M)||$Cu^{2+}$(aq, 0.0010M)|Cu Students can construct cells using a 1.0M $Cu^{2+}$|Cu half-cell as the reference to measure the unknown concentration of the zinc solution. For example, EMF=1.130 V Zn|$Zn^{2+}$(aq, 0.10M)||$Cu^{2+}$(aq, 1.0M)|Cu EMF=1.160 V Zn|$Zn^{2+}$(aq, 0.010M)||$Cu^{2+}$(aq, 1.0M)|Cu EMF=1.188 V Zn|$Zn^{2+}$(aq, 0.0010M)||$Cu^{2+}$(aq, 1.0M)|Cu Students can construct cells using a 1.0M $Zn^{2+}$|Zn half-cell as the reference to measure the unknown concentration of the nickel solution. For example, EMF=0.480 V Zn|$Zn^{2+}$(aq, 1.0M)||$Ni^{2+}$(aq, 0.10M)|Ni EMF=0.451 V Zn|$Zn^{2+}$(aq, 1.0M)||$Ni^{2+}$(aq, 0.010M)|Ni EMF=0.421 V Zn|$Zn^{2+}$(aq, 1.0M)||$Ni^{2+}$(aq, 0.0010M)|Ni Students can construct cells using a 1.0M $Ni^{2+}$|Ni half-cell as the reference to measure the unknown concentration of the zinc solution. For example, EMF=0.540 V Zn|$Zn^{2+}$(aq, 0.10M)||$Ni^{2+}$(aq, 1.0M)|Ni EMF=0.570 V Zn|$Zn^{2+}$(aq, 0.010M)||$Ni^{2+}$(aq, 1.0M)|Ni EMF=0.600 V Zn|$Zn^{2+}$(aq, 0.0010M)||$Ni^{2+}$(aq, 1.0M)|Ni The electrochemical cell exemplifies an experimental configuration where the experiment is essentially complete when the experimental configuration has been assembled. The reading of the voltmeter is the only further action required of the experimenter.

Figure 7:
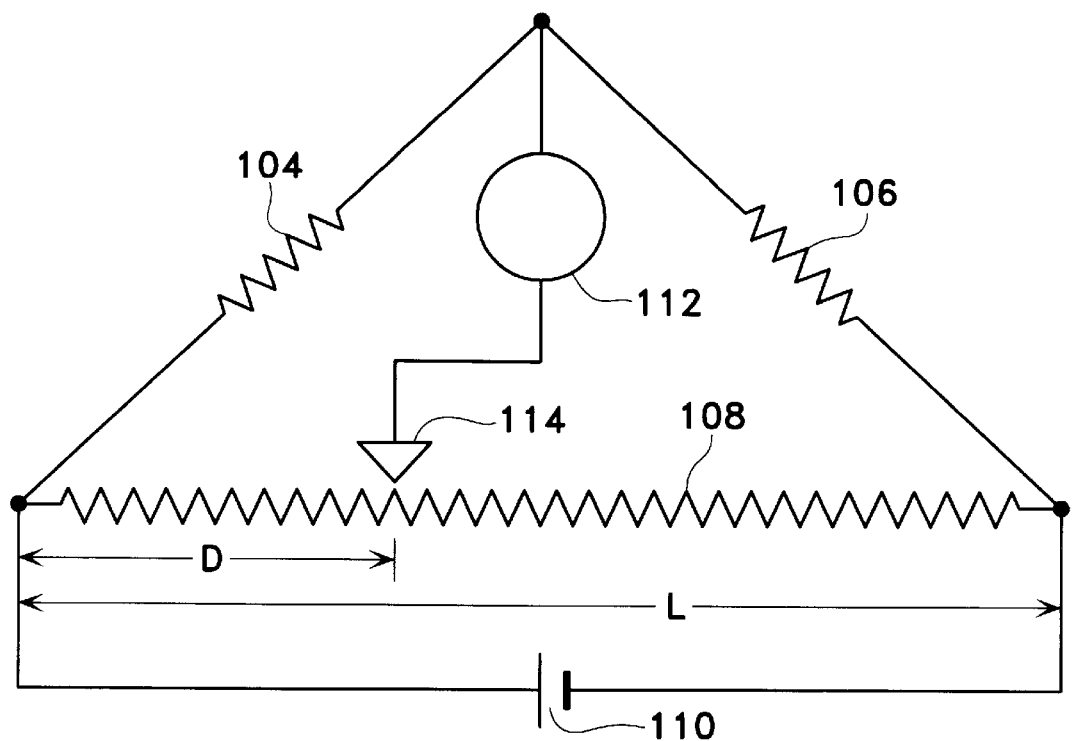
FIG. 7 shows a symbolic diagram of a Wheatstone bridge.

An example of an experimental configuration where the experiment requires further participation by the experimenter after assembly is the Wheatstone bridge shown in FIG. 7. The Wheatstone bridge consists of the series-connected resistors 104 and 106 bridged across the resistor 108, the battery 110 that powers the bridged resistors, and the current meter 112 connected between the junction of the series-connected resistors and the slider 114 that makes contact with resistor 108. When the slider is so positioned that no current is registered by the current meter 112, the experimental parameters R(104), R(106), D, and L which characterize the experimental configuration are related by the characterizing equation $$R(104)/R(106)=D/(L-D) \qquad (3)$$

where R(104) is the resistance of resistor 104, R(106) is the resistance of resistor 106, D is the distance of the slider 114 from one end of resistor 108, and L is the length of resistor 108.

When the value of one of the experimental parameters is unknown, it can be determined by first adjusting the slider 114 and then substituting the known values of the other parameters in equation (3).

In performing a simulation of the Wheatstone bridge experiment, the student must first assemble the Wheatstone bridge experimental configuration on the computer screen and then he must drag the slider in one direction or the other until zero current flow is shown on the current meter 112. Typically, the value of either resistor 104 or resistor 106 will be unknown to the user and he will be called upon to determine the value of the resistor by measuring the distance D by means of a scale that lies next to resistor 108 on the screen.

Figure 8:
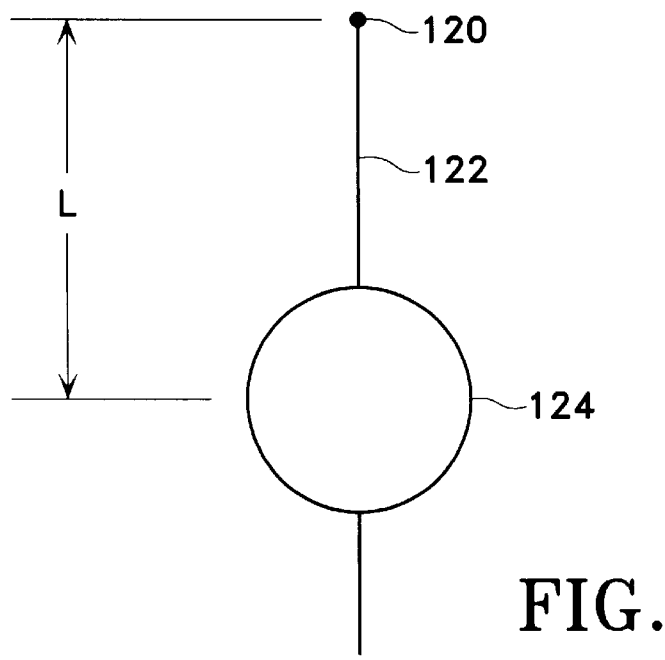
FIG. 8 is a drawing of a simple pendulum.

An example of an experimental configuration where the experimenter must observe the operation of the experimental configuration over a period of time after it has been assembled is the simple pendulum shown in FIG. 8. It consists of a support 120, a thin-wire suspension 122, and a disc 124 which can be moved up and down the suspension 124.

The operation of the pendulum is characterized by the equation $$T=2\pi(L/g)^{1/2} \qquad (4)$$

where T, L, and g are the experimental parameters. The parameter T is the period of the pendulum, L is the distance of the center of the disc 124 to the support 120, and g is the acceleration of gravity. A typical experiment involving the simple pendulum requires the experimenter to measure L and T and determine g using equation (4).

The student performs a simulation of this experiment by assembling the pendulum on the computer screen, dragging the disc 124 to the side to start the pendulum oscillating, and then measuring the period of the pendulum by observing a clock displayed on the screen.

The operation of the preferred embodiment has been illustrated by means of experiments in chemistry and physics. The invention can be used in teaching any subject matter where the learning process is enhanced by the performance of experiments involving the manipulation of apparatus. Typically, such experiments are carried out in laboratories but might also be carried out in other surroundings, e.g. the propagation of high frequency radio waves between New York and California.

The performance of a science or engineering experiment typically involves the assembly of devices, apparatus, and equipment into an experimental configuration, the operation of which can be characterized by the relationship that exists among a plurality of experimental parameters. The relationship may be represented by an equation or tables of values for the experimental parameters. The objectives of an experiment are typically to: (1) assemble the experimental configuration, (2) measure the value of one of the experimental values under specified conditions, and (3) determine the value of another of the experimental values using the characterizing equation or tables of values, the measured parameter value, and known values of the remaining parameters.

In the case of the electrochemical cell experimental configuration, the characterizing equation is the Nernst equation (1) and the experimental parameters are the cell potential, the standard oxidation-reduction potentials E° of the anode and the cathode, the concentrations of the two solutions, and the number n of electrons removed from the metal electrode atom in creating the ion. In the case of the first experiment, the student was required to build the experimental configuration and measure one of the experimental parameters—the cell potential. In the case of the second experiment, the student was required to also determine the unknown concentration of one of the solutions.

What is claimed is:

1. An apparatus for teaching science and engineering to a user, the apparatus comprising:

a means for displaying imagery;

a means for causing a plurality of objects to be pictured on the display means, the objects being apparatus, equipment, devices, materials, and supplies used in science and engineering;

a means by which the user can assemble a plurality of the objects pictured on the display means into an operating pictorial representation of an operating experimental configuration, the experimental configuration being characterized by a relationship among a plurality of experimental parameters;

a means by which the user can simulate the performance of an experiment using the pictorial representation of the experimental configuration, an experiment being a method of measuring one of the plurality of experimental parameters by means of the experimental configuration, the operation of the pictorial representation of the experimental configuration being governed by the same relationship among the experimental parameters that characterizes the operation of the experimental configuration.

2. The apparatus of claim 1 further comprising:

means for changing the values of the experimental parameters each time an experiment is performed.

3. The apparatus of claim 1 further comprising:

a means for measuring the value of the same experimental parameter measured by the user during the experiment.

4. The apparatus of claim 3 further comprising:

a means for determining the value of an experimental parameter using the characterizing relationship among the experimental parameters and measured and given values for all of the other experimental parameters.

5. The apparatus of claim 4 further comprising:

a means for causing the value of an experimental parameter to be displayed on the display means.

6. The apparatus of claim 4 further comprising:

a means for showing plots of measured and calculated experimental parameters versus other experimental parameters and functions of other experimental parameters, the nature of the plots being specified by the user.

7. A method for using the apparatus of claim 6 comprising the steps:

requesting that data be plotted;

specifying the data to be plotted and the nature of the plots;

observing the requested data plots.

8. The apparatus of claim 1 further comprising:

a means for showing on the display means a phenomenon selected from a plurality of phenomena that occur during the performance of the experiment using the experimental configuration.

9. The apparatus of claim 8 wherein the phenomenon is selected from the following phenomena: (1) changes in the objects making up the experimental configuration including changes in size, shape, state, position, orientation, temperature, pressure, composition, and appearance; (2) changes in the relationships of the objects making up the experimental configuration; (3) the flow of energy within, into, and out of the objects in the experimental configuration; (4) the propagation of waves within, into, and out of the objects in the experimental configuration; (5) the flow of matter within, into, and out of the objects in the experimental configuration; (6) the flow of atoms, molecules, ions, and electrons within, into, and out of the objects in the experimental configuration; (7) the flow of other elementary particles not enumerated above within, into, and out of the objects in the experimental configuration; (8) the occurrence of electric and magnetic fields; and (9) the occurrence of temperature, density, and pressure gradients.

10. A method for using the apparatus of claim 8 comprising the steps:

selecting a phenomenon for observation;

observing the selected phenomenon.

11. The apparatus of claim 1 further comprising:

a means for guiding the user in the construction of the pictorial representation of the experimental configuration and the simulated performance of the experiment.

12. A method for using the apparatus of claim 11 comprising the steps:

selecting an experiment to be performed;

requesting guidance in the construction of the pictorial representation of the experimental configuration and the simulated performance of the experiment;

assembling the pictorial representation of the experimental configuration with the requested guidance;

performing the experiment with the requested guidance.

13. The apparatus of claim 1 further comprising:

a means for showing on the display means a motion picture selected from a plurality of motion pictures relating to the subject matter of the experiment.

14. A method for using the apparatus of claim 13 comprising the steps:

selecting a motion picture for observation;

observing the selected motion picture.

15. The apparatus of claim 1 further comprising:

a means for testing the user on his knowledge of the subject matter relating to the experiment.

16. The apparatus of claim 15 wherein the testing means utilizes values of the experimental parameters, the apparatus further comprising:

a means for selecting different values of the experimental parameters each time the user is tested.

17. A method for using the apparatus of claim 15 comprising the steps:

entering a request to be tested;

being tested.

18. The apparatus of claim 1 further comprising:

a means for storing data representing voice messages and sounds;

a means for transforming the stored data into voice messages and sounds.

19. The apparatus of claim 18 wherein sounds appropriate to the existence and interaction of objects in an experimental configuration are produced when the pictures of the objects in the pictorial representation of the experimental configuration exist and interact on the display means.

20. The apparatus of claim 1 further comprising:

a means by which the user can cause data necessary for the assembly of the pictorial representation of the experimental configuration and the performance of an experiment to be displayed on the display means.

21. A method for using the apparatus of claim 20 comprising the steps:

selecting an experiment to be performed;

requesting data necessary for the assembly of the pictorial representation of the experimental configuration;

assembling the pictorial representation of the experimental configuration using the requested data;

performing the experiment.

22. A method for using the apparatus of claim 20 comprising the steps:

selecting an experiment to be performed;

assembling the pictorial representation of the experimental configuration;

requesting data necessary for performing the experiment;

performing the experiment using the requested data.

23. The apparatus of claim 1 further comprising:

a means by which the user can change the operating speed of the pictorial representation of the experimental configuration relative to the operating speed of the experimental configuration.

24. A method for using the apparatus of claim 23 comprising the steps:

selecting an experiment to be performed;

assembling the pictorial representation of the experimental configuration;

requesting that the pictorial representation of the experimental configuration operate either faster or slower than the experimental configuration;

performing the experiment.

25. A method for using the apparatus of claim 1 comprising the steps:

selecting an experiment to be performed;

assembling the pictorial representation of the experimental configuration;

performing the experiment.

26. A method for teaching science and engineering to a student, the method comprising the steps:

providing a means for displaying imagery;

causing a plurality of objects to be pictured on the display means, the objects being apparatus, equipment, devices, materials, and supplies used in science and engineering;

enabling the student to assemble a plurality of the objects pictured on the display means into an operating pictorial representation of an operating experimental configuration, the experimental configuration being characterized by a relationship among a plurality of experimental parameters;

enabling the student to simulate the performance of an experiment using the pictorial representation of the experimental configuration, an experiment being a method of measuring one of the plurality of experimental parameters by means of the experimental configuration, the operation of the pictorial representation of the experimental configuration being governed by the same relationship among the experimental parameters that characterizes the operation of the experimental configuration.

27. The method of claim 26 further comprising the step:

changing the values of the experimental parameters each time an experiment is performed.

28. The method of claim 26 further comprising the step:

measuring the value of the same experimental parameter measured by the student during the experiment.

29. The method of claim 28 further comprising the step:

determining the value of an experimental parameter using the characterizing relationship among the experimental parameters and measured and given values for all of the other experimental parameters.

30. The method of claim 29 further comprising the step:

causing the value of an experimental parameter to be displayed on the display means.

31. The method of claim 29 further comprising the step:

showing plots of measured and calculated experimental parameters versus other experimental parameters and functions of other experimental parameters, the nature of the plots being specified by the student.

32. The method of claim 26 further comprising the step:

showing on the display means a phenomenon selected from a plurality of phenomena that occur during the performance of the experiment using the experimental configuration.

33. The method of claim 32 wherein the phenomenon is selected from the following phenomena: (1) changes in the objects making up the experimental configuration including changes in size, shape, state, position, orientation, temperature, pressure, composition, and appearance; (2) changes in the relationships of the objects making up the experimental configuration; (3) the flow of energy within, into, and out of the objects in the experimental configuration; (4) the propagation of waves within, into, and out of the objects in the experimental configuration; (5) the flow of matter within, into, and out of the objects in the experimental configuration; (6) the flow of atoms, molecules, ions, and electrons within, into, and out of the objects in the experimental configuration; (7) the flow of other elementary particles not enumerated above within, into, and out of the objects in the experimental configuration; (8) the occurrence of electric and magnetic fields; and (9) the occurrence of temperature, density, and pressure gradients.

34. The method of claim 26 further comprising the step:

guiding the student in the construction of the pictorial representation of the experimental configuration and the simulated performance of the experiment.

35. The method of claim 26 further comprising the step:

showing on the display means a motion picture selected from a plurality of motion pictures relating to the subject matter of the experiment.

36. The method of claim 26 further comprising the step:

testing the student on his knowledge of the subject matter relating to the experiment.

37. The method of claim 36 wherein the testing step utilizes values of the experimental parameters, the method further comprising the step:

selecting different values of the experimental parameters each time the student is tested.

38. The method of claim 17 further comprising the step:

producing sounds appropriate to the existence and interaction of objects in an experimental configuration when the pictures of the objects in the pictorial representation of the experimental configuration exist and interact on the display means.

39. The method of claim 26 further comprising the step:

enabling the student to cause data necessary for the assembly of the pictorial representation of the experimental configuration and the performance of an experiment to be displayed on the display means.

40. The method of claim 26 further comprising the step:

enabling the student to change the operating speed of the pictorial representation of the experimental configuration relative to the operating speed of the experimental configuration.

* * * * *